United States Patent [19]

Murata et al.

[11] Patent Number: 5,428,391
[45] Date of Patent: Jun. 27, 1995

[54] VIDEO SIGNAL PROCESSING CIRCUIT FOR A VIDEO CAMERA HAVING A RECURSIVE-TYPE NOISE REDUCER

[75] Inventors: Haruhiko Murata, Osaka; Yukio Mori, Kyoto; Akihiro Maenaka, Osaka; Masao Takuma, Osaka; Kiyotada Kawakami, Osaka; Toru Asaeda, Nara; Toshiyuki Okino, Osaka; Toshiya Iinuma, Osaka; Akio Kobayashi, Osaka; Toshinobu Haruki, Osaka, all of Japan

[73] Assignee: Sanyo Electric Co., Ltd., Osaka, Japan

[21] Appl. No.: 255,728

[22] Filed: Jun. 7, 1994

Related U.S. Application Data

[62] Division of Ser. No. 21,590, Feb. 24, 1993, Pat. No. 5,345,264.

[30] Foreign Application Priority Data

Feb. 27, 1992 [JP] Japan ................ 4-41205
Feb. 28, 1992 [JP] Japan ................ 4-43198
Mar. 2, 1992 [JP] Japan ................ 4-44690
Apr. 6, 1992 [JP] Japan ................ 4-83964

[51] Int. Cl.$^6$ ......................... H04N 5/262
[52] U.S. Cl. .................. 348/240; 348/231; 348/241
[58] Field of Search ........... 348/231, 239, 240, 241, 348/581, 607, 608, 620, 909; 358/180, 167; H04N 5/213, 5/262, 5/217, 9/74

[56] References Cited

U.S. PATENT DOCUMENTS 4,984,070  1/1991  Tanaka .................. 348/620
5,333,015  7/1994  Harigaya ................ 348/620

*Primary Examiner*—James J. Groody
*Assistant Examiner*—Sherrie Hsia
*Attorney, Agent, or Firm*—Armstrong, Westerman, Hattori, McLeland & Naughton

[57] ABSTRACT

Auto focus control and/or auto exposure control is carried out by using a luminance signal before gamma correction, before addition of aperture signal but after hand shake correction. Auto white balance control is carried out by using a color signal after hand shake correction. Consequently, precise auto focus control, auto exposure control and/or auto white balance control can be done. The field memory for electronic zooming and/or hand shake correction is also used as a field memory for noise reduction. Consequently, a video signal processing circuit which is inexpensive and simple can be implemented.

2 Claims, 4 Drawing Sheets

VIDEO SIGNAL PROCESSING CIRCUIT FOR A VIDEO CAMERA HAVING A RECURSIVE-TYPE NOISE REDUCER

This is a division of application Ser. No. 08/021,590, filed Feb. 24, 1993, now U.S. Pat. No. 5,345,264.

BACKGROUND OF THE INVENTION

1. Field of the Invention

The present invention relates to a video signal processing circuit and, more specifically, to a video signal processing circuit for a video camera which separates a video signal obtained by AD conversion of an output of an image pickup device to a luminance signal and a color signal for output.

2. Description of the Background Art

Recently, video cameras called cam corders have been presented and various types of such video cameras inn which video signal processing is carried out digitally have come to be available these days. Further, digital type video signal processing circuits having functions of auto focus for automatical focus adjustment, auto exposure for automatically adjusting exposure, auto white balance for automatical tone adjustment and of hand shake correction for correcting unnecessary motion of the picked-up image caused by hand shake have been proposed.

A conventional digital type video signal processing circuit is disclosed, for example, in Nikkei Electronics Feb. 3, 1992(No. 546), pp. 237–241.

Figure 3:
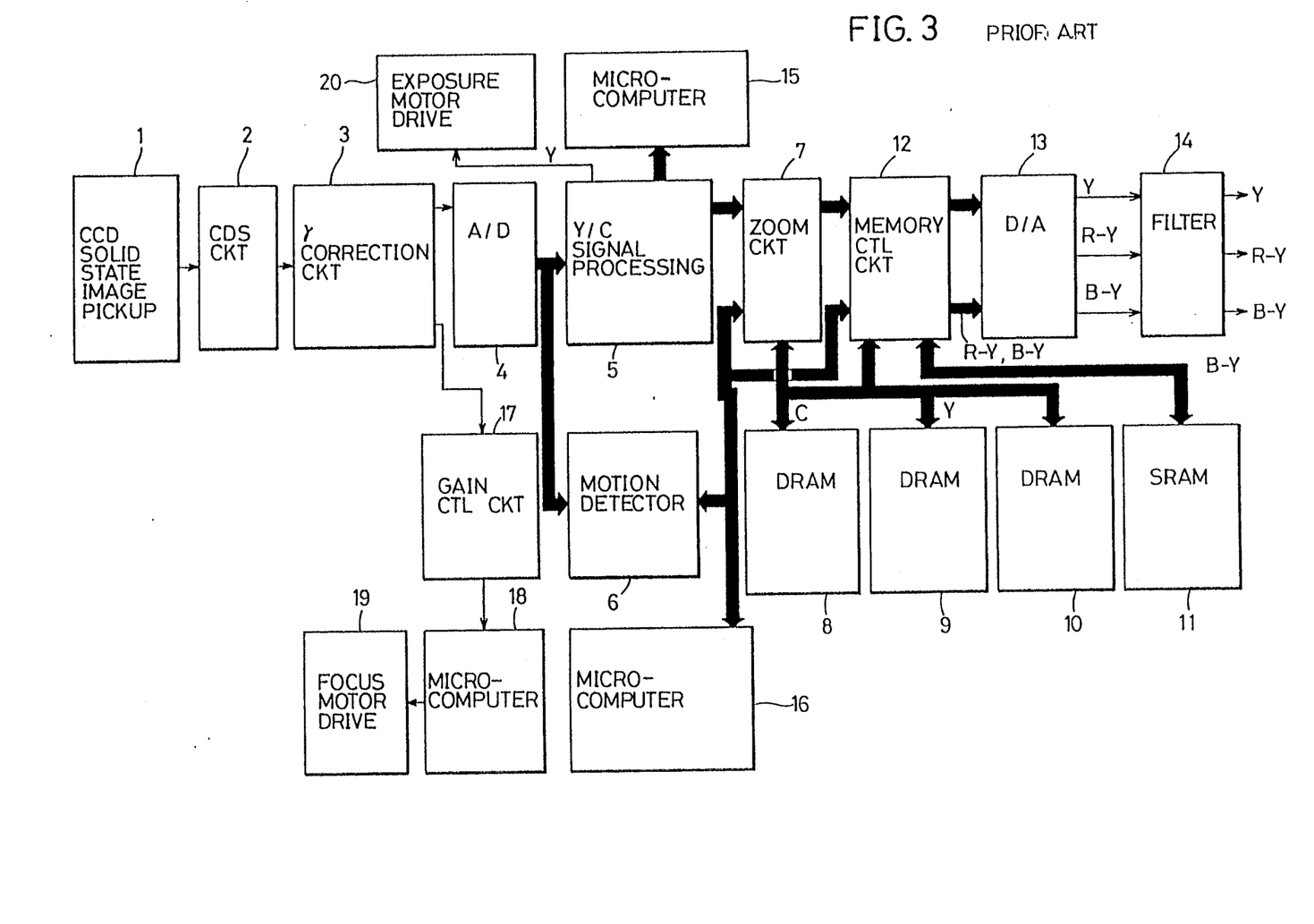
FIG. 3 is a block diagram showing a conventional video signal processing circuit.

FIG. 3 is a block diagram showing a whole structure of a video signal processing circuit disclosed in the above mentioned article.

As shown in FIG. 3, the video signal processing circuit receives an analog video signal from a CCD type solid state image pickup device 1, separates the received signal to a luminance signal Y and color signals R-Y and B-Y and outputs the same.

The video signal processing circuit includes a correlated double sampling circuit (CDS) 2, a gamma correction circuit 3, an AD converter 4, Y/C signal processing circuit 5, a motion detecting circuit 6, a zoom processing circuit 7, field memories 8, 9, 10 and 11, a memory control circuit 12, a DA converter 13 and a filter 14.

Correlated double sampling circuit 2 removes noise component from the analog video signal received from solid state image pickup device 1. Y/C signal processing circuit 5 separates the digital video signal receive from AD converter 4 into a luminance signal Y and a color signal C. Y/C signal processing circuit 5 further carries out signal processings such as aperture correction on luminance signal Y and white balancing on color signal C, in cooperation with a microcomputer 15. Motion detection circuit 6 compares video data including the luminance signal Y and the color signal C received from AD converter 4 with video data which is one field preceding, and detects direction and amount of motion of the object. Motion detection circuit 6 and field memories 8, 9 and 10 realize hand shake correction in cooperation with a microcomputer 16. DA converter 13 carries out DA conversion of video data which has been subjected to hand shake correction, and outputs an analog luminance signal Y and two color signals R-Y and B-Y.

In the video signal processing circuit, auto focus control is carried out by a gain control circuit 17, a microcomputer 18 and a focus motor driving circuit 19 based on an analog video signal received from gamma correction circuit 3.

Meanwhile, auto exposure control is carried out by a exposure motor driving circuit 20 based on the luminance signal Y received from Y/C signal processing circuit 5.

Generally, auto focus control in a video camera is carried out in the following manner. Namely, after an analog video signal is subjected to AD conversion, high frequency component thereof is extracted by high pass filter. The high frequency component is digitally accumulated at a prescribed period in each of a plurality of areas obtained by dividing the picked-up image plane. Based on the accumulated value, a prescribed operation processing is done by the microcomputer, and the result of the operation processing is applied as an auto focus control signal to a focus motor which drives the optical system. The reason why the high frequency component is extracted by the high pass filter is that the high frequency component included in the video signal is increased as the image is brought into focus.

Auto exposure control in a video camera is carried out in the following manner. Namely, after an analog video signal is AD converted, low frequency component is extracted by a low pass filter. Then, the low frequency component is accumulated digitally at a prescribed period in each of a plurality of areas obtained by dividing the picked-up image plane. Based on this accumulated value, a prescribed operation processing is done by a microcomputer, and the result of the operation processing is applied as an auto exposure control signal to an iris motor driving the diaphragm.

Further, auto white balance control in a video camera is carried out in the following manner. Namely, an analog video signal is AD converted and accumulated digitally at a prescribed period in each of a plurality of areas of a divided picked-up image plane. Based on the accumulated value, a prescribed operation processing is done by a microcomputer and the result of the operation processing is fed back as an auto white balance control signal to Y/C signal processing circuit and the like.

Figure 4:
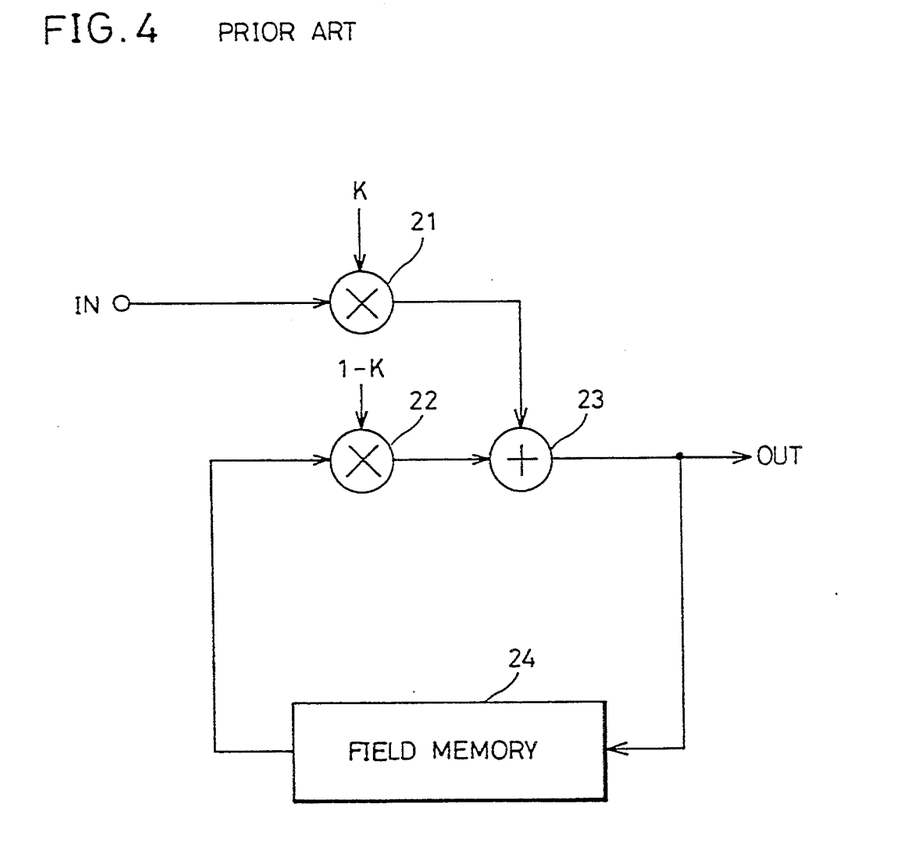
FIG. 4 is a block diagram showing a general recursive type noise reducer.

A recursive type noise reducer such as shown in FIG. 4 is known as a device for reducing noises included in the video signal. As shown in FIG. 4, the noise reducer includes two multipliers 21 and 22, one adder 23 and a field memory 24.

The noise reducer reduces noises appearing at random as time passes, and a coefficient K of multiplier 21 is controlled to be in the range of "0<K<1" corresponding to the motion of a motion picture. In case of a still image, the coefficient K of multiplier 21 is made close to "0" so as to provide larger effect of noise reduction.

In the above described video signal processing circuit, auto focus control is based on the video signal which has been subjected to gamma correction by the gamma correction circuit 3. Since gamma correction is non-linear processing, it makes precise auto focus control difficult. Especially in this video signal processing circuit, auto focus control is carried out based on the video signal before the luminance signal Y and the color signal C are separated, and therefore precise auto focus control is made more difficult by the unnecessary color signal C component.

Further, since auto exposure control is also carried out based on the luminance signal Y after gamma correction, precise auto exposure control is difficult.

Meanwhile, in the above described video signal processing circuit, most of the blocks are formed by separate IC chips. It is generally proposed to incorporate a portion of the digital signal processing circuit including AD converter 4, Y/C signal processing circuit 5, zoom processing circuit 7, memory control circuit 12 and DA converter 13 on one IC chip.

However, in that case, it is necessary to separately provide an accumulating circuit and a high pass filter for auto focus control outside the IC chip. The same also applies to auto exposure control.

Further, in that case, accumulation must be done by using an analog video signal input to the IC chip or by using a digital luminance signal output from the IC chip.

In the former method using the analog video signal, an AD converter for AD conversion of the analog video signal must be separately provided. In addition, since the video signal does not have its luminance signal Y and color signal C separated therefrom, precise auto focus control or precise auto exposure control cannot be done because of the color signal component or the luminance signal component included in the video signal.

Meanwhile, in the latter method using the digital luminance signal, since an aperture signal is added to the digital luminance signal and non-linear operation has been effected thereon, it is difficult to carry out precise auto focus control or auto exposure control.

Further, in the video signal processing circuit described above, auto focus control and auto exposure control are carried out based on the signal before hand shake correction. Therefore, the accumulated value output from the accumulating circuit fluctuates because of the hand shake, which makes precise auto focus control and auto exposure control difficult.

It is preferred that the aforementioned recursive type noise reducer is provided in the video signal processing circuit. However, it newly requires an expensive field memory 24.

SUMMARY OF THE INVENTION

An object of the present invention is to provide a video signal processing circuit capable of precise auto focus control, auto exposure control and/or auto white balance control. Another object of the present invention is to provide a simple and inexpensive video signal processing circuit including a recursive noise reducer.

Briefly stated, the present invention provides a video signal processing circuit for a video camera, including a Y/C separating means for separating a video signal obtained by AD conversion of an output from an image pickup device into a luminance signal and a color signal for outputting, and auto focus accumulating means accumulating, at a prescribed period, high frequency component of the luminance signal before gamma correction output from the Y/C separating means, for outputting the result as an auto focus reference signal for automatic focus adjustment. The luminance signal accumulated by the auto focus accumulating means is the signal before the addition of the aperture signal. Further, the video signal processing circuit including the auto focus control means is formed by one IC chip.

According to another aspect, the video signal processing circuit of the present invention includes Y/C separating means for separating a video signal obtained by AD conversion of an output from an image pickup device to a luminance signal and a color signal for outputting, and auto exposure accumulating means for accumulating low frequency component of the luminance signal before gamma correction output from Y/C separating means, at a prescribed period, for outputting the result as an auto exposure reference signal for automatic exposure adjustment. The luminance signal accumulated by the auto exposure accumulating means is the signal before addition of the aperture signal. The video signal processing circuit including the auto exposure accumulating means is formed by one IC chip.

According to a further aspect, the video signal processing circuit of the present invention includes hand shake correcting means for correcting hand shake of a video signal obtained by AD conversion of an output from an image pickup device for outputting, a Y/C separating means for separating the video signal having hand shake corrected and output from the hand shake correcting means to a luminance signal and a color signal for outputting, and auto focus accumulating means for accumulating, at a prescribed period, high frequency component of the luminance signal output from Y/C separating means and for outputting the result as an auto focus reference signal for automatic focus adjustment.

According to a still further aspect, the video signal processing circuit of the present invention includes hand shake correcting means for correcting hand shake of a video signal obtained by AD conversion of an output from an image pickup device for outputting, Y/C separating means for separating the hand shake-corrected video signal output from the hand shake correcting means to a luminance signal and a color signal for outputting, and an auto exposure accumulating means for accumulating, at a prescribed period, low frequency component of the luminance signal output from the Y/C separating means for outputting the result as an auto exposure reference signal for automatic exposure adjustment.

According to a still further aspect, the video signal processing circuit of the present invention includes shake correcting means for correcting hand shake of a video signal obtained by AD conversion of an output from an image pickup device for outputting, Y/C separating means for separating the video signal having hand shake corrected and output from the hand shake correcting means to a luminance signal and a color signal for outputting, and auto white balance accumulating means for accumulating, at a prescribed period, the color signal output from the Y/C separating means and for outputting the result at auto white balance reference signal for automatic tone adjustment.

According to a still further aspect, the present invention provides a video signal processing circuit for a video camera including memory means for storing at least 1 field of video signals obtained by AD conversion of an output from an image pickup device, memory control means for controlling reading from the memory means in accordance with a prescribed zoom magnification, interpolating means for interpolating output signals from the memory means in accordance with the zoom magnification, and a recursive noise reducing means for reducing noises which are not correlated with time, in which the memory means is also used as a memory means constituting the recursive noise reducing means.

According to a still further aspect, the present invention provides a video signal processing circuit for a video camera including memory means for storing at least one field of video signals obtained by AD conversion of an output from an image pickup device, motion vector detecting means for detecting motion vector from the digital video signal for hand shake correction, memory control means for controlling reading from the memory means in accordance with the motion vector detected by the motion vector detecting means and/or a prescribed zoom magnification, interpolating means for interpolating output signals from the memory means in accordance with the zoom magnification, and a recursive type noise reducing means for reducing noises which are not correlated with time, in which the memory means is also used as memory means constituting the recursive type noise reducing means.

Therefore, an advantage of the present invention is, since auto focus control or auto exposure control is carried out by using the luminance signal at least before gamma correction and preferably before addition of the aperture signal, precise auto focus control or auto exposure control can be done.

Another advantage of the present invention is that precise auto focus control, auto exposure control or auto white balance control can be done since such control is effected by the luminance signal after hand shake correction.

A still further advantage of the present invention is that simple and inexpensive video signal processing circuit can be implemented since the memory means for hand shake correction and/or electronic zooming is also used as memory means for the recursive noise reducer.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
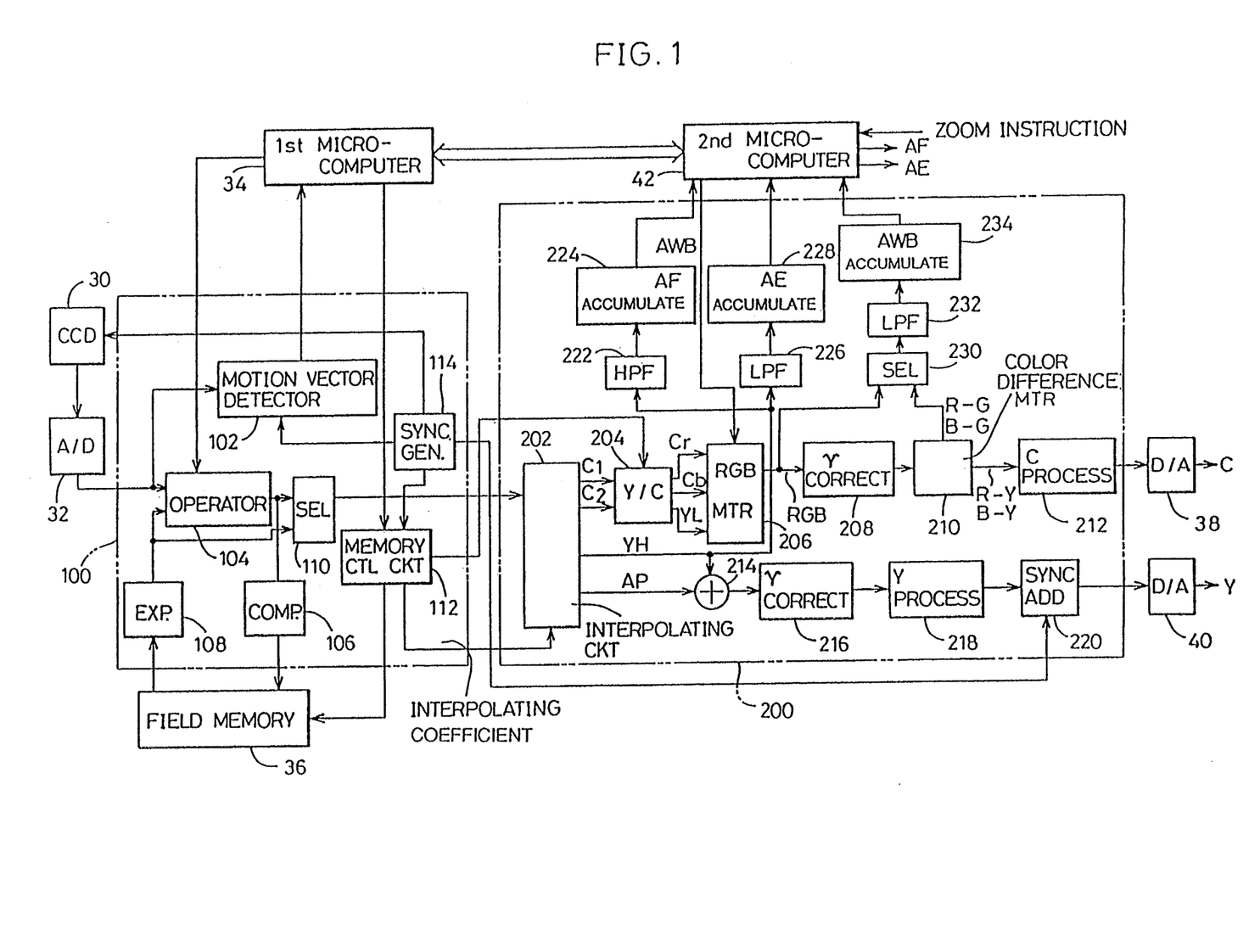
FIG. 1 is a block diagram showing a video signal processing circuit in accordance with one embodiment of the present invention.

FIG. 1 is a block diagram showing a video signal processing circuit for a video camera in accordance with one embodiment of the present invention. As shown in FIG. 1, the video signal processing circuit includes a hand shake correcting IC 100 for correcting hand shake, and a digital signal processing IC 200 for carrying out separation of the video signal to a luminance signal Y and a color signal C, and so on. Hand shake correcting IC 100 includes a motion vector detecting circuit 102, an operating portion 104 of a recursive type noise reducer, a compression circuit 106, an expansion circuit 108, a selector 110, a memory control circuit 112 and a synchronizing signal generating circuit 114.

Hand shake correcting IC receives 10 bits of digital video signals obtained by AD conversion by an AD converter 32 of an analog video signal from a CCD type solid state image pickup device 30, carries out processings such as hand shake correction, noise reduction and electronic zooming, and applies the result to the signal processing IC 200. As the solid state image pickup device 30, one having a prescribed mosaic type color filter arranged on its image pickup surface is used.

Motion vector detecting circuit 102 divides the picked-up image plane into four detecting blocks in accordance with a known representative point matching technique, detects a motion vector indicative of direction and distance of movement of the picked-up image plane in every detecting block, and applies the motion vectors to the first microcomputer 34. The first microcomputer 34 specifies one motion vector from the motion vectors of these detecting blocks.

Operating portion 104 of the recursive type noise reducer constitutes, together with an externally provided field memory 36, the recursive type noise reducer.

Figure 2:
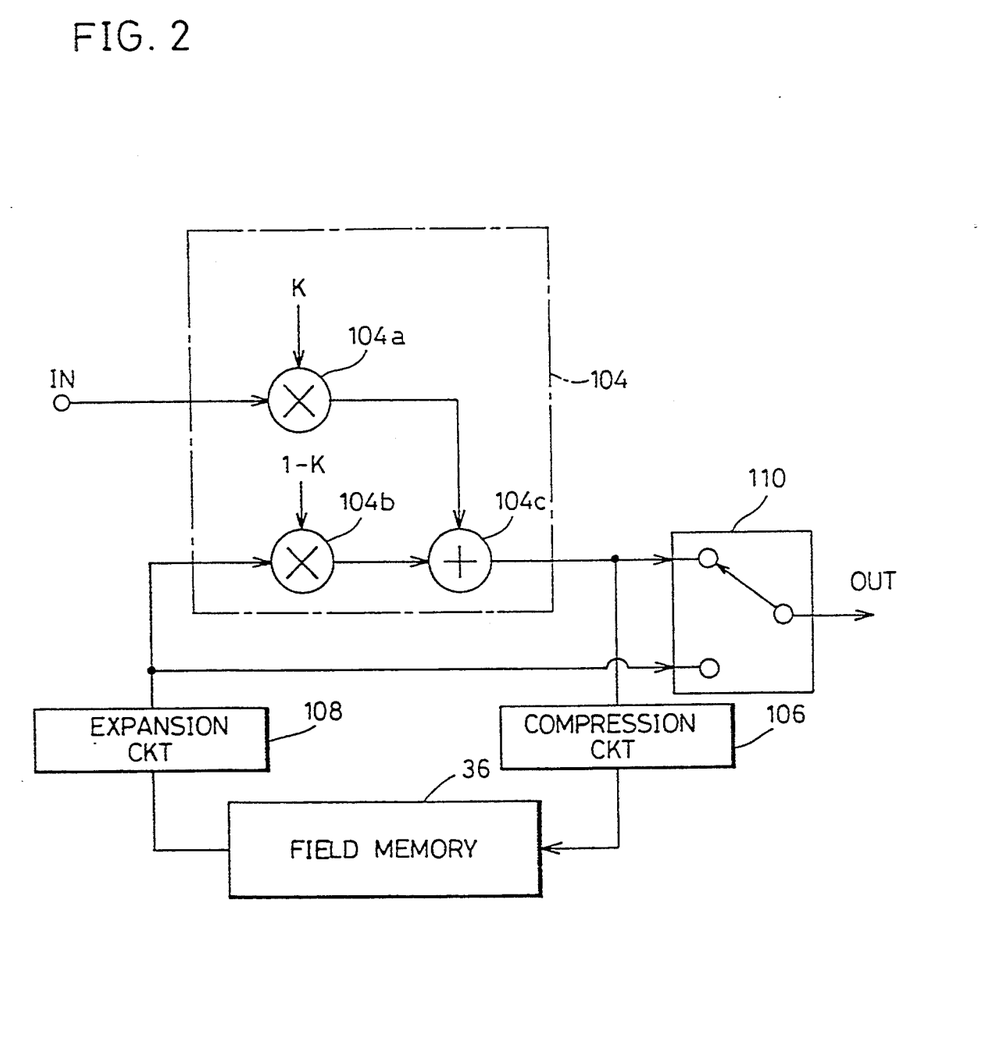
FIG. 2 is a block diagram showing details of the recursive type noise reducer shown in FIG. 1.

FIG. 2 is a block diagram showing in greater detail the recursive noise reducer.

The recursive type noise reducer reduces noises appearing at random as time passes from the digital video signal received from AD converter 32, that is, the noises not related to time, and includes operating portion 104, compression circuit 106, field memory 36 and expansion circuit 108. Further, the operating portion 104 includes a multiplier 104a for multiplying the digital video signal received from AD converter 32 by a prescribed coefficient K, a multiplier 104b for multiplying the video signal received from expansion circuit 108 by a prescribed coefficient 1−K, and an adder 104c for adding the results of calculations of the multipliers 104a and 104b.

Compression circuit 106 writes 10 bits of digital video signals resulting from the operation of adder 104c to field memory 46 by compressing the same to 8 bits. Field memory 36 is formed of, for example, a DRAM and stores video signals of 1 field. Expansion circuit 108 expands 8 bits of digital video signals read from field memory 36 to 10 bits and applies the same to multiplier 104b.

Selector 110 selects and outputs either the output from expansion circuit 108 or the output from adder 104c, constituting the noise reducer.

Memory control circuit 112 controls writing to field memory 36 in accordance with a write start address received from the first microcomputer 34 and controls reading from field memory 36 in accordance with a read start address corresponding to the motion vector and/or zoom magnification (for example, 1 to 4) received from the first microcomputer 34. Memory control circuit 112 further controls repetitive reading of the same data by generating reading pulses in accordance with the zoom magnification. Memory control circuit 112 calculates interpolation coefficient corresponding to the zoom magnification and applies the same to interpolating circuit 202 of the signal processing IC 200, which will be described later. More specifically, memory control circuit 112 controls reading and writing from and to the field memory 36, and controls electronic zooming by applying an interpolation coefficient to the interpolating circuit 202. Synchronizing signal generating circuit 114 generates horizontal and vertical synchronizing signals based on a clock pulse and a start pulse, and applies these signals to the solid state image pickup device 30, motion vector detecting circuit 102, memory control circuit 112 and a synchronization adding circuit 220 of the digital signal processing IC 200, which will be described later.

At first, hand shake correcting operation by the hand shake correcting IC 100 will be described.

An analog video signal from solid state image ]pickup device 30 is converted to 10 bits of digital video signals by AD converter 32 and applied to hand shake correcting IC 100. The digital video signal is applied to motion vector detecting circuit 102 in which four motion vectors are detected. These four motion vectors are applied to the first microcomputer 34, and the first microcomputer 34 specifies one motion vector. The specified motion vector is applied to memory control circuit 112.

Meanwhile, the digital video signal received from AID converter 32 is also applied to multiplier 104a. However, when hand shake correction is to be carried out, "1" is applied as the prescribed coefficient K from the first microcomputer 34, and therefore the digital video signal is applied to adder 104c as it is. Since the prescribed coefficient 1−K in multiplier 104b is "0", the video signal is applied to compression circuit 106 as it is. At this time, since an Output from expansion circuit 108 is selected in selector 110, the video signal is not output as it is.

Accordingly, the digital video signal applied from AD converter 32 is compressed by compressing circuit 106 and stored in the field memory 36. In accordance with the read start address and zooming magnification (for example, 1.2) for hand shake correction applied from memory control circuit 112, reading from the field memory 36 is controlled. Thus, the picked-up image plane is taken in accordance with the direction and magnitude of hand shake, precise video signal without the influence of hand shake is expanded by expanding circuit 108, and the resulting signal is output from the selector 110.

Electronic zooming operation by hand shake correcting IC 100 will be described.

The output from expansion circuit 108 is also selected when electronic zooming is to be carried out, and "1" is applied as the prescribed coefficient K of multiplier 104a from the first microcomputer 34.

Therefore, in this case also, the digital video signal received from AD converter 32 is compressed by compression circuit 106 as it is, and stored in the field memory 36. Reading from field memory 36 is controlled in accordance with the zooming magnification by memory control circuit 112. The video signal read from field memory 36 is expanded by expansion circuit 108 and output through selector 110.

Although hand shake correction and electronic zooming are described separately, these operations can be carried out simultaneously.

The operation of the recursive type noise reducer will be described.

When the noise reducer is to be operated, an output from adder 104c is selected by selector 110, and a prescribed coefficient K (0<K<1) is applied from the first microcomputer 34 to multiplier 104a in accordance with the movement of the image. For example, if the image is a still image, a value very close to "0" is applied, and since a number of fields of the video signals are accumulated, noises appearing at random as time passes are canceled out and reduced.

Since the field memory 36 necessary for handshake correction and electronic zooming is also used as a field memory necessary for the noise reducer, what is necessary is simply a provision of one field memory 36 outside, and therefore the structure is simple and inexpensive.

In hand shake correcting IC 110, a selector 110 for selecting either an output from adder 104c or an output from expansion circuit 108 is provided, and when hand shake correction or electronic zooming is to be done, the output from expansion circuit 108 is selected and the prescribed coefficient K of operating portion 104 is set to "1", so as not to operate the noise reducer. When hand shake correction or electronic zooming is being carried out, it is necessary to stop the operation of the noise reducer, since correlation between data of video signals applied from AD converter 32 and of the video signal read from the field memory 36 is lost.

The digital signal processing IC 200 will be described.

As shown in FIG. 1, the signal processing IC 200 includes interpolating circuit 202, Y/C separating circuit 204, a RGB matrix circuit 206, a gamma correction circuit 208, a color difference matrix circuit 210 and a color signal processing circuit 212.

Interpolating circuit 200 receives a digital video signal output from the above described hand shake correcting IC 100, interpolates image data in horizontal and vertical directions in accordance with the interpolating coefficient applied from memory control circuit 112 of hand shake correcting IC 100, applies two color signals C1 and C2 to Y/C separating circuit 204, and generates a luminance signal including high frequency component (hereinafter referred to as "a high frequency luminance signal") YH and an aperture signal AP. Aperture signal AP is a signal emphasizing contour of an image, and there are two aperture signals AP, that is, in the horizontal and vertical directions.

Y/C separating circuits 204 receives two color signals C1 and C2, and separates the same to color signals (color difference signals) Cr and Cb, and a luminance signal including low frequency component (hereinafter referred to as "a low frequency luminance signal") YL. RGB matrix circuit 206 receives color signals Cr and Cb as well as the low frequency luminance signal YL, and generates point sequential RGB color signals such as R→G→B→R→G→. . . . Gamma correction circuit 208 receives RGB signal and carries out gamma correction. Gamma correction means a correction of total gamma characteristic of the entire system including all components from image pickup device to the display device to be constantly 1, based on photoelectric conversion characteristic (gamma characteristic) of the image pickup device and on the non-linear photoelectric conversion characteristic of the display device.

Color difference matrix circuit 210 receives the gamma corrected RGB color signals, and generates difference signals R-Y and B-Y. Color signal processing circuit 212 receives these color difference signals R-Y and B-Y, and carries out various signal processings such as modulation to NTSC color signals.

The signal processing IC 200 further includes an aperture adding circuit 214, a gamma correction circuit 216, a luminance signal processing circuit 218 and a synchronization adding circuit 220.

Aperture adding circuit 214 adds the aperture signal AP to the high frequency luminance signal YH. Luminance signal processing circuit 218 suppresses low level luminance signal and low level noise, matches timing with the color signal, and so on. Synchronization adding circuit 220 adds the synchronizing signal received from the synchronizing signal generating circuit 114 of the above described hand shake correcting IC 100.

The signal processing IC 200 further includes a high pass filter 222 and an auto focus accumulating circuit 224.

High pass filter 222 receives high frequency luminance signal YH from interpolating circuit 202 and extracts the high frequency component therefrom. Auto focus accumulating circuit 224 accumulates digitally the high frequency component of the luminance signal received from high pass filter 222 at the period of 1 field for each of the plurality of divided areas of the picked-up image plane.

The signal processing IC 200 further includes a low pass filter 226 and an auto exposure accumulating circuit 228.

Low pass filter 226 receives high frequency luminance signal YH from interpolating circuit 202, and extracts low frequency component therefrom. Auto exposure accumulating circuit 228 accumulates digitally the low frequency component of the luminance signal received from low pass filter 226 at a period of 1 field for each of the plurality of divided areas of the picked-up image plane.

The signal processing IC 200 further includes a selector 230, a low pass filter 232 and an auto white balance accumulating circuit 234.

Selector 230 is provided for selecting either the RGB color signals from the RGB matrix circuit 206 or the color difference signals R-G and B-G from the color difference matrix circuit 210, and it allows free selection by the user. Low pass filter 232 receives either the RGB color signals or the color difference signals R-G and B-G selected by the selector 230, and extracts low frequency component therefrom. Auto white balance accumulating circuit 234 accumulates digitally the RGB signals or the color difference signals R-G and B-G for each of the plurality of divided areas of the picked-up image plane at the period of 1 field.

As for the RGB color signals, it is adapted that the same color signal is obtained field by field before the selection of the selector 230, and for the period of 1 field, the same color signal is accumulated by the auto white balance accumulating circuit 234. Similarly, as for the color difference signals R-Y and B-Y, it is adapted such that the same color difference signal is obtained field by field.

Details of each of the blocks of the digital signal processing IC 200 are not described here, since the auto focus accumulating circuit 224, the auto exposure accumulating circuit 228, and the auto white balance accumulating circuit 234 are disclosed in U.S. Pat. No. 5,003,339 assigned to the same assignee as the present application, which is incorporated herein by reference.

The operation of the digital signal processing IC 200 will be described. A digital video signal which has been subjected to hand shake correction or the like by the hand shake correcting IC 100 is input to interpolating circuit 202. The digital video signal is provided with image data interpolation in horizontal and vertical directions corresponding to the interpolation coefficient from the memory control circuit 112 by interpolating circuit 202, whereby two color signals C1 and C2 are applied to Y/C separating circuit 204, and a high frequency luminance signal YH and an aperture signal AP are generated.

The color signals C1 and C2 are separated into color signals Cr and Cb as well as a low frequency luminance signal YL by Y/C separating circuit 204, and they are applied to RGB matrix circuit 206.

These color signals Cr and Cb as well as the low frequency luminance signal YL are converted to point sequential RGB color signals by RGB matrix circuit 206, and applied to gamma correction circuit 208.

RGB color signals are subjected to gamma correction by gamma correction circuit 208, converted to color difference signals R-Y and B-Y by color difference matrix circuit 210 and applied to color signal processing circuit 212.

The color difference signals R-Y and B-Y are subjected to various signal processings such as modulation to NTSC color signal by color signal processing circuit 212, and output as digital color signals. The digital color signals are converted to analog color signals C by DA converter 38 to be applied to the VTR processing portion and the like in the succeeding stage.

The high frequency luminance signal YH generated by interpolating circuit 202 has the aperture signal AP added thereto by aperture adding circuit 214, and it is applied to gamma correction circuit 216. The high frequency luminance signal YH with aperture signal AP added thereto is subjected to gamma correction by gamma correcting circuit 216 and applied to luminance signal processing circuit 218.

The gamma corrected high frequency luminance signal YH has its low level noise and the low level luminance signal suppressed and its timing matched with color signals by luminance signal processing circuit 218, a synchronizing signal is added by synchronization adding circuit 220, and the signal is output as a digital luminance signal. The digital luminance signal is converted to an analog luminance signal Y by DA converter 40 to be applied to the VTR processing portion and the like in the succeeding stage.

The high frequency luminance signal YH generated by interpolating circuit 202 is applied to high pass filter 222 and to low pass filter 226. The high frequency luminance signal applied to high pass filter 222 has its high frequency component extracted and applied to an auto focus accumulating circuit 224. The high frequency component of the luminance signal is digitally accumulated at the period of 1 field for each of the plurality of divided areas of the picked-up image plane by auto focus accumulating circuit 224, and output as an auto focus reference signal. Based on this reference signal, a prescribed operation processing is done by a second microcomputer 42 which can communicate with the first microcomputer 34, and the result of operation processing is applied as an auto focus control signal AF to a focus motor driving the optical system.

The prescribed operation processing done by the second microcomputer 42, is disclosed in U.S. Pat. No. 5,003,339 described above.

Since auto focus control is done by using a luminance signal before gamma correction, non-linear operation is not effected, and therefore precise auto focus control is possible. Since auto focus control is done by using the luminance signal before addition of the aperture signal AP, precise auto focus control is possible. Further, since the luminance signal after hand shake correction is used for auto focus control, the result of operation is not influenced by the hand shake, and precise auto focus control is possible.

The high frequency luminance signal YH applied to low pass filter 226 has its low frequency component extracted by low pass filter 226 and applied to an auto exposure accumulating circuit 228. The low frequency component of the luminance signal is digitally accumulated by the auto exposure accumulating circuit 228 at the period of 1 field for every one of a plurality of divided areas of the picked-up up image plane, and output as an auto exposure reference signal. The auto exposure reference signal is applied to the second microcomputer 42, the microcomputer 42 effects a prescribed operation processing thereon, and the result of the operation processing is applied as an auto exposure control signal AE to an iris motor driving the diaphragm.

The prescribed operation processing effected by the second microcomputer 42, is disclosed in U.S. Pat. No. 5,003,339 described above.

Since auto exposure control is carried out by using the luminance signal before gamma correction, non-linear operation is not effected, and therefore precise auto exposure control is possible. Similarly, since auto exposure control is done by using the luminance signal before addition of the aperture signal AP, precise auto exposure control is possible. Further, since auto exposure control is carried out by using the luminance signal after hand shake correction, the result of accumulation is not influenced by the hand shake, and precise auto exposure control is possible.

Further, the RGB color signals from the RGB matrix circuit 206 or color difference signals R-G and B-G from color difference matrix circuit 210 are selected by the selector 230 to be applied to the low pass filter 232. Either of the color signals selected has its low frequency component extracted by low pass filter 232 to be applied to the white balance accumulating circuit 234. The low frequency component of the color signal is digitally accumulated by the auto white balance accumulating circuit 234 at the period of 1 field for every one of the plurality of divided areas of the picked-up image plane, and output as an auto white balance reference signal. The auto white balance reference signal is applied to the second microcomputer 42, the second microcomputer 42 carries out a prescribed operation processing, and the result of the operation processing is fed back to the RGB matrix circuit 206 as an auto white balance control signals, so that the prescribed coefficient of the circuit 206 is controlled.

Since auto white balance control is carried out by using the color signal after hand shake correction, the result of accumulation is not influenced by the hand shake, and precise auto white balance control is possible.

In the digital signal processing IC 200, accumulating circuits and filters necessary for auto focus control, auto exposure control and auto white balance control are contained, and therefore it is not necessary to separately provide these components outside the IC chip. Therefore, the size of the peripheral circuitry of the digital signal processing IC 200 can be considerably reduced.

Although the present invention has been described and illustrated in detail, it is clearly understood that the same is by way of illustration and example only and is not to be taken by way of limitation, the spirit and scope of the present invention being limited only by the means of the appended claims.

What is claimed is:

1. A video signal processing circuit for a video camera, comprising:
    memory means for storing at least one field of a video signal obtained by AD conversion of an output from an image pickup device;
    memory control means for controlling reading from said memory means in accordance with a prescribed zoom magnification;
    interpolating means for interpolating an output signal from said memory means in accordance with the zoom magnification; and
    recursive type noise reducing means, operably coupled to said interpolating means, for reducing noise not related with time,
    wherein said memory means also serves as memory means constituting said recursive said recursive type noise reducing means.

2. A video signal processing circuit for a video camera, comprising:
    memory means for storing at least one field of a video signal obtained by AD conversion of an output from an image pickup device;
    motion vector detecting means for detecting a motion vector for hand shake correction from said video signal;
    memory control means for controlling reading from said memory means in accordance with at least one of the motion vector detected by said motion vector detecting means and a prescribed zoom magnification;
    interpolating means for interpolating an output signal from said memory means in accordance with said zoom magnification; and
    recursive type noise reducing means, operably coupled to said interpolating means, for reducing noise not related with time,
    wherein said memory means also serves as memory means constituting said recursive type noise reducing means.

* * * * *